United States Patent
Hartin et al.

(10) Patent No.: US 12,107,945 B2
(45) Date of Patent: Oct. 1, 2024

(54) ELECTRICAL SIGNAL DELAY CALIBRATION SYSTEM

(71) Applicant: Raytheon Company, Waltham, MA (US)

(72) Inventors: Paul T. Hartin, McKinney, TX (US); Ro S. Ko, McKinney, TX (US); Thomas T. Leise, Collinsville, TX (US); Edward Escandon, Richardson, TX (US)

(73) Assignee: RAYTHEON COMPANY, Waltham, MA (US)

( * ) Notice: Subject to any disclaimer, the term of this patent is extended or adjusted under 35 U.S.C. 154(b) by 76 days.

(21) Appl. No.: 18/154,117

(22) Filed: Jan. 13, 2023

(65) Prior Publication Data

US 2024/0243897 A1 Jul. 18, 2024

(51) Int. Cl.
*H04L 7/00* (2006.01)

(52) U.S. Cl.
CPC .................................. *H04L 7/0008* (2013.01)

(58) Field of Classification Search
CPC .................................................... H04L 7/0008
See application file for complete search history.

(56) References Cited

U.S. PATENT DOCUMENTS

| | | | | |
|---|---|---|---|---|
| 8,878,707 | B1* | 11/2014 | Wang | H03M 1/0836 341/172 |
| 9,867,155 | B1* | 1/2018 | Tertinek | H04W 56/003 |
| 9,887,760 | B1* | 2/2018 | Sridharan | H04B 17/318 |
| 2014/0023048 | A1* | 1/2014 | Vu | H04B 7/26 370/336 |
| 2014/0253200 | A1* | 9/2014 | Gunn | H04B 3/462 327/276 |
| 2014/0269769 | A1* | 9/2014 | Gresham | H04L 47/34 370/474 |
| 2023/0331231 | A1* | 10/2023 | Mujumdar | B60W 60/001 |
| 2024/0007214 | A1* | 1/2024 | de Koos | H04J 3/0697 |

* cited by examiner

*Primary Examiner* — Jaison Joseph
(74) *Attorney, Agent, or Firm* — CANTOR COLBURN LLP

(57) ABSTRACT

An electrical signal delay calibration system includes a device under test (DUT) and a digital signal processing chip including a plurality of signal lanes. Each signal lane includes a receive signal path in signal communication with a respective DUT receive path and a transmit signal path in signal communication with a respective DUT transmit path. A processor is configured to determine transmit pulse timestamps assigned to transmit signals transmitted on the transmit signal paths and to determine receive pulse timestamps assigned to receive signals received from the receive signal paths. The processor determines a lane asymmetry associated with each signal lane based on at least one of the transmit pulse timestamps and at least one of the receive pulse timestamps, and removes each of the lane asymmetries to minimize a signal delay in each signal lane among the plurality of signal lanes.

20 Claims, 6 Drawing Sheets

ELECTRICAL SIGNAL DELAY CALIBRATION SYSTEM

BACKGROUND

The present disclosure relates to electrical signal processing, and more particularly, to systems and method for performing electrical signal delay calibrations.

Various signal communication systems require synchronization between the signal delivered from the transmitter(s) and the signal received at the receiver(s). Signal processing techniques are widely used in electrical signal time distribution applications to identify signal delays between the reception (Rx) and transmission (Tx) signal (and vice versa), and to calibrate and synchronize the Rx-Tx timings. Signal delays can occur, for example, when asymmetries exist between the reception paths and the transmission paths. For example, a length of the receive path may be longer than a length of the transmit path, which causes a signal delay between the time at which the signal travels on the transmit path compared to the time at which the signal travels on the receive path.

In applications where both the transmit path and the receive path are inaccessible to probes or other measurement tools, a first timestamp of the signal traveling on the transmit path can be measured, a second timestamp of the signal traveling the receive path can be measured, and a difference (i.e., signal delay) can be calculated based on the difference between the second timestamp and the first timestamp. The signal processor can then be controlled or programmed to offset or adjust the signal delay so that the asymmetry in the signal timing is removed, thereby calibrating the Tx signal and the Rx signal with respect to one another.

SUMMARY

According to a non-limiting embodiment, an electrical signal delay calibration system includes a device under test (DUT) including a plurality of DUT receive paths and a plurality of DUT transmit signal paths, and a digital signal processing chip including a plurality of signal lanes. Each signal lane includes a receive signal path in signal communication with a respective DUT receive path and a transmit signal path in signal communication with a respective DUT transmit path. A processor is configured to determine a plurality of transmit pulse timestamps assigned to transmit signals transmitted on the transmit signal paths and to determine a plurality of receive pulse timestamps assigned to receive signals received from the receive signal paths. The processor determines a lane asymmetry associated with each signal lane among the plurality of signal lanes based on at least one of the transmit pulse timestamps and at least one of the receive pulse timestamps. The processor removes each of the lane asymmetries to minimize a signal delay in each signal lane among the plurality of signal lanes.

In accordance with a non-limiting embodiment, a method of calibrating electrical signal delays comprises connecting a device under test (DUT) receive path to a receive signal path included in a signal lane among a plurality of signal lanes included in the digital logic circuitry, and connecting a DUT transmit path to a transmit signal path included in the signal lane. The method further includes delivering one or more transmit signals on one or more of the transmit signal lines and receiving one or more receive signals on one or more of the receive signal lines. The method further includes determining, by a processor, a plurality of transmit pulse timestamps assigned to the transmit signals and determining a plurality of receive pulse timestamps assigned to the receive signals. The method further comprises determining, by the processor, a lane asymmetry associated with each signal lane among the plurality of signal lanes based on at least one of the transmit pulse timestamps and at least one of the receive pulse timestamps. The method further comprises removing, by the processor, each of the lane asymmetries to minimize a signal delay in each signal lane among the plurality of signal lanes.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
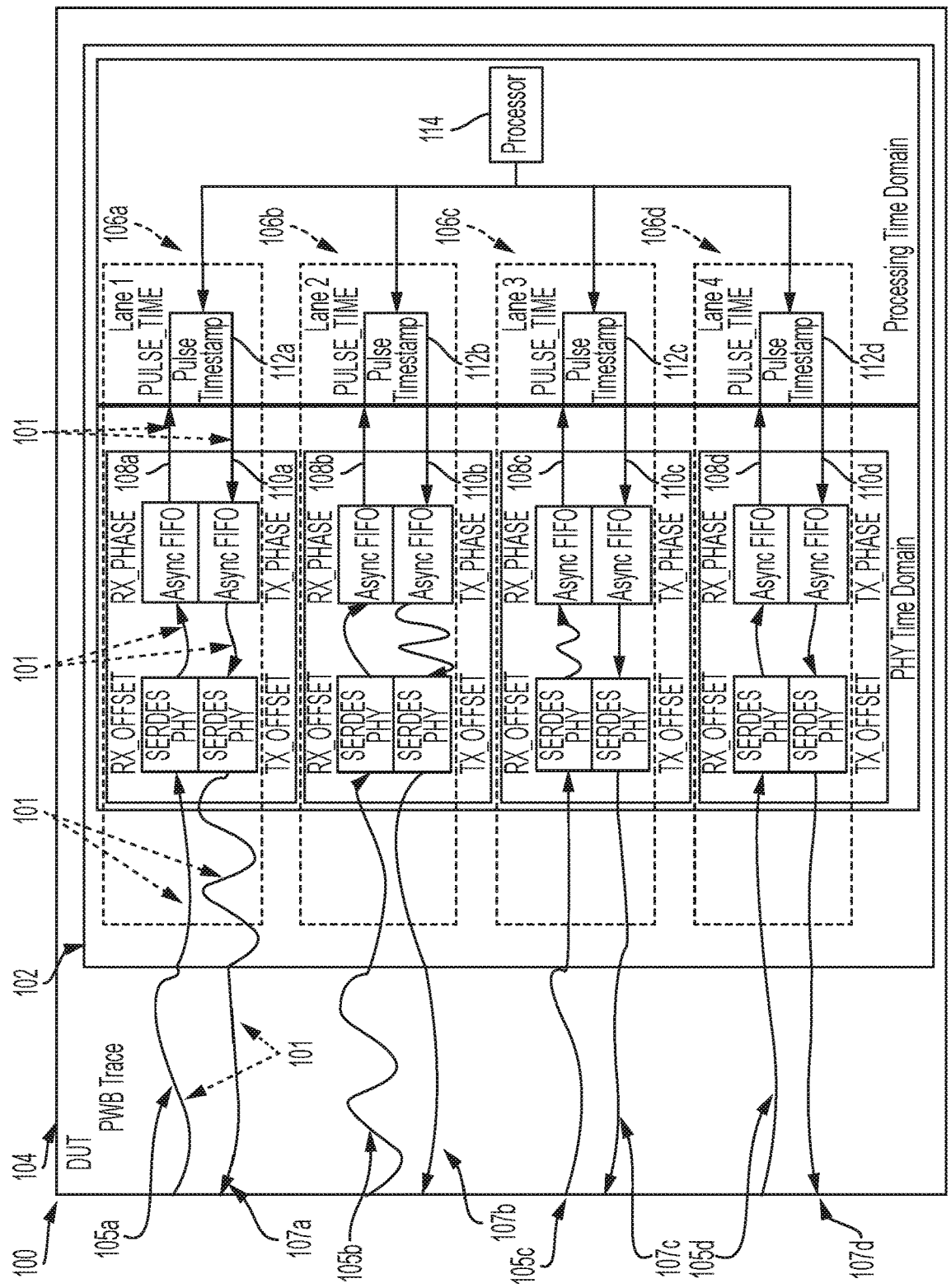
FIG. 1 is a block diagram illustrating a non-calibrated electric signal time distribution system.

Field programmable gate arrays (FPGAs) are widely utilized in signal processing applications due to the ability to configure their internal logic and memory to operate with a specific signal processing application. The designs of FPGAs are also modular, and the end-user can implement multiple hardware designs to ensure the FPGA fits into specific systems. The end-user or programmer can take advantage of hardware description languages such as Verilog HDL, VHDL, and SystemC to implement the hardware's design. In the following descriptions, the FPGA is just one example of "digital logic circuitry" and does not restrict the concept. The FPGA in the following can be replaced by any form of digital electronic circuitry implementing the required functions.

Digital signal processing chips such as Field Programmable Gate Arrays (FPGAs), for example, are known to be implemented in various radar applications and ultra-wideband digital phased array radar systems. These FPGAs can implement one or more Serializer/Deserializer (SerDes)

transceivers to convert analog signals into digital signals. Each digital signal is then processed and modified according to its respective digital signal conditioning value to perform phase alignment (e.g. conditioning) and timing synchronization.

A multi-node or "multi-lane" digital signal processing chip (e.g. an FPGA) that implements multiple delay/phase sensitive signal paths, however, can introduce Rx-to-Tx or Tx-to-Rx skew values that can occur where the Rx and Tx signal paths originate or terminate inside the digital signal processing chip. In some instances, for example, the signal skew values vary from one device to another, or even for identical devices due to process variations, and therefore cannot be analytically determined. These skew values are difficult to accurately characterize/calibrate because the signals and signal paths inside the digital signal processing chip are not accessible to probes or other measurement tools. Therefore, known methods or techniques typically relied upon to measure and determine signal delays and unable to measure the precise values of the signal skews, and are therefore unable to determine sufficient accurate time-of-arrival time stampings across the multiple nodes or signal lanes of the digital signal processing chip.

Similarly, the amplitude and phase of Rx and/or Tx signals in a digital array are difficult to calibrate and synchronize due to the delay from the timestamp clock to the ADC/DAC clock and/or the varying delays and/or losses that occur both external to the analog-to-digital converters (ADCs) and/or the digital-to-analog converters (DACs). These timestamp delays cause inaccurate time-of-arrival signal timestamps and can cause an inability to align sub-arrays. To compensate for the possible inaccurate time-of-arrival signal timestamps, the system typically employs a separate RF calibration signal, which requires additional processing and circuitry which results in undesirable added expense and resource loading.

Various non-limiting embodiments of the present disclosure provides an electric signal delay calibration system capable of performing timing, amplitude and phase calibration using round robin correlation and statical optimization to improve measurement, calibration and synchronization of digital signal delays and/or radio frequency (RF) signal delays. The electric signal delay calibration system performs measurement, calibration and synchronization of signal using a round-robin measurement scheme and statistical optimization to determine path lengths of the Tx and Rx signal paths, and the asymmetry in time and/or phase between digital and/or mixed signal bidirectional nodes (e.g., bi-directional signal lanes). One instantiation of such calibrations is to keep precision time synchronization between the transmitter and receiver communicating with each other over an arbitrary medium, which may or may not exhibit delay differences between transmit and receive paths.

According to a non-limiting embodiment, the round-robin measurement scheme and statistical optimization involves connecting two lanes together. For example, the Tx signal path of the first lane can be connected to the Rx signal path of the second lane. Simultaneously, the Tx signal path of the second lane can be connected to the Rx signal path of the first lane. A signal is then sent from the first lane to the second lane and a first timestamp of the TOA at the second lane is recorded. After a predetermined time delay or known time delay has occurred, the signal is returned from the second lane to the first lane and a second timestamp of the TOA at the first lane is recorded. This timestamp recording process is repeated for every combination of signal lane pairs included in the digital signal processing chip. A pair asymmetry for each signal lane pair is then calculated based on the first and second timestamps of the respective signal lane pair.

An optimization analysis such as a least squares method, for example, is then performed using each of the pair asymmetries to determine the Tx and Rx delay values for each lane to minimize the total error. Accordingly, the total error provided by the optimization analysis can be used to determine the signal skew values that create the minimum total error across all lane measurement combinations. In this manner, the delay contributions for each Tx signal path and each Rx signal path included in the digital signal processing chip can be identified and precisely measured. The electric signal delay calibration system and corresponding methods described herein can enable time distribution improvements greater than an order of magnitude over existing signal delay measurement techniques by determining the delay occurring at inaccessible delay points of the digital signal processing chip.

With reference now to FIG. 1, an electric signal delay calibration system 100 is illustrated according to a non-limiting embodiment. The electric signal delay calibration system 100 includes a digital signal processing chip 102 includes digital logic circuitry operable within a device under test (DUT) 104. The digital signal processing chip 102 can be integrated circuits (ICs) that implement various multi-node or "multi-lane" digital signal processing chips such as, for example, a Field Programmable Gate Array (FPGA), an Application-Specific Integrated Circuit (ASIC), etc. Accordingly, digital signal processing chip 102 implements multiple delay/phase sensitive signal paths (e.g., multiple receive signal paths and multiple transmit paths), which can introduce multiple delay points 101. These delay points 101 can appear where the Rx and Tx signal paths originate or terminate inside the digital signal processing chip within the digital signal processing chip 102 and can contribute to Rx-to-Tx or Tx-to-Rx skew values that cannot be measured and identified using conventional signal calibration and synchronization techniques.

The digital signal processing chip 102 includes a plurality of signal lanes 106a, 106b, 106c and 106d (collectively referred to as 106a-106d), a plurality of pulse sensors 112a, 112b, 112c and 112d (collectively referred to as 112a-112d), and a processor 114. Each signal lane 106a-106d includes a digital signal processing chip receive signal path 108a, 108b, 108c and 108d (collectively referred to as 108a-108d) made up of multiple delay points 101 within the digital signal processing chip 102. Each signal lane 106a-106d also includes a digital signal processing chip transmit signal path 110a, 110b, 110c and 110d (collectively referred to as 110a-110d) made up of multiple delay points 101 within the digital signal processing chip 102.

Each of the DSP chip receive paths 108a-108d are connected to DUT receive (Rx) paths 105a-105d on the DUT 104. The Rx paths 105a-105d comprise of the entire receive path from the input of the DUT 104 to the input of the DSP chip 102 and may be composed of PWB traces, components, and cable assemblies. Likewise, each of the transmit paths 110a-110d are connected to DUT transmit (Tx) paths 107a-107d on the DUT 104. The Tx paths 107a-107d comprise of the entire transmit path from the output of the DSP chip 102 to the output of the DUT 104 and may be established using PWB traces, components, and/or cable assemblies. While FIG. 1 illustrates an instantiation with four paths 107a-107d, the present disclosure can be extended to any arbitrary number of lanes.

Figure 2:
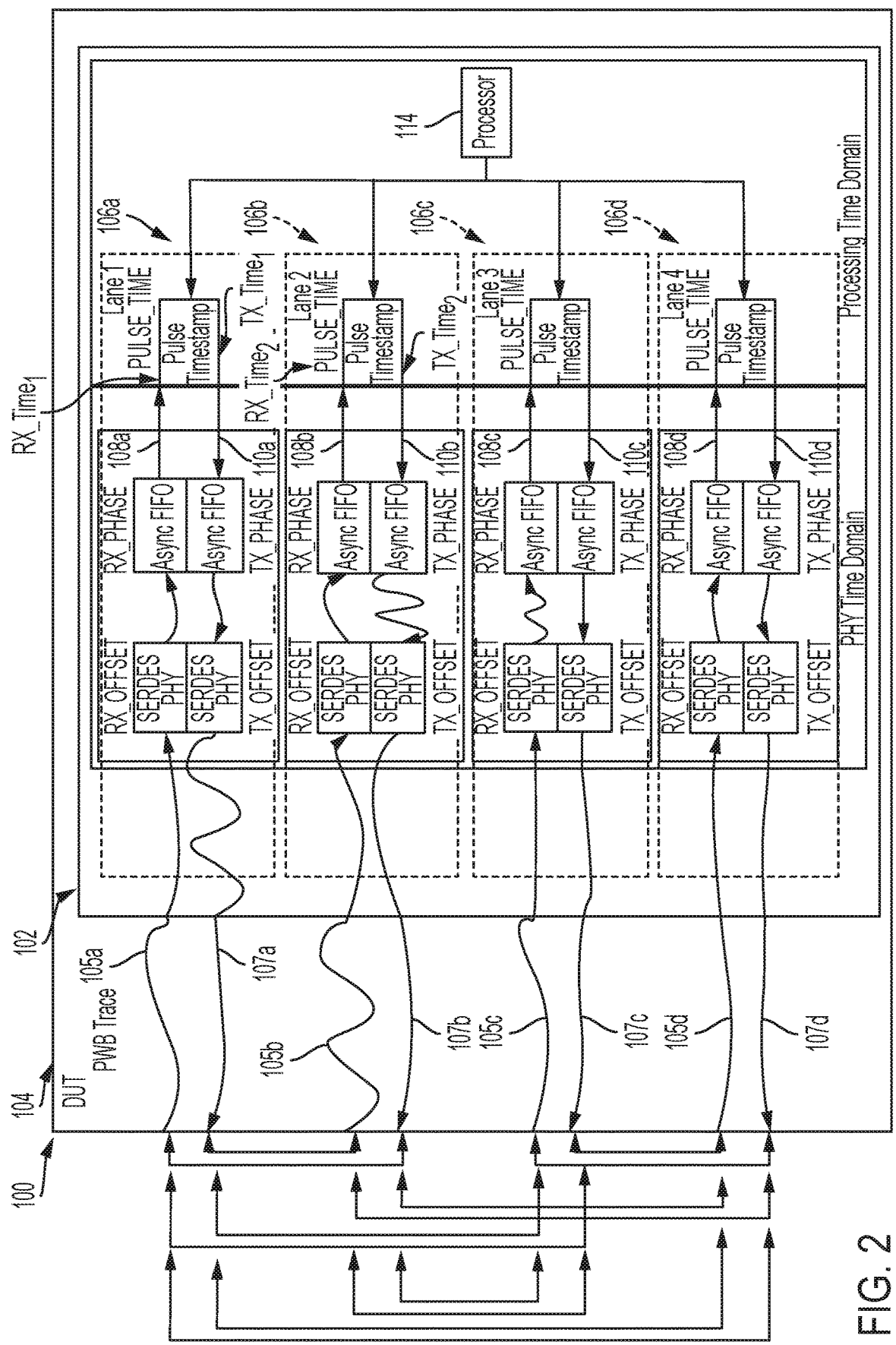
FIG. 2 is a block diagram illustrating the electric signal time distribution system of FIG. 1 performing a round-robin timestamp measuring scheme according to a non-limiting embodiment.

As shown in FIG. 2, for example, the Tx paths 107a-107d may be connected via a cable or other method to the Rx paths 105a-105d. The Tx paths 107a-107d and Rx paths 105a-105d of the same lane do not connect together during the measurement process (e.g., 107a connects to 105b-105d, but not 105a). Accordingly, one or more combinations of signal lane pairs can be established.

In a first processing run (run1) for example, a first signal lane pair (Pair$_{1,2}$) is established by connecting the receive path 105a of lane 1 (106a) is connected to transmit path 107b of the lane 2 (106b), and the transmit path 107a of lane 1 (106a) is connected to the receive path 105b of lane 2 (106b). Likewise, a second signal lane pair (Pair$_{3,4}$) is established by connecting the receive path 105c of lane 3 (106c) is connected to transmit path 107d of the lane 4 (106d), and the transmit path 107c of lane 1 (106c) is connected to the receive path 105d of lane 4 (106d). In a second processing run (run2) for example, a third signal lane pair (Pair$_{1,3}$) is established by connecting the receive path 105a of lane 1 (106a) is connected to transmit path 107c of the lane 3 (106c), and the transmit path 107a of lane 1 (106a) is connected to the receive path 105c of lane 3 (106c). Likewise, a fourth signal lane pair (Pair$_{2,4}$) is established by connecting the receive path 105b of lane 2 (106b) is connected to transmit path 107d of the lane 4 (106d), and the transmit path 107b of lane 2 (106b) is connected to the receive path 105d of lane 4 (106d). In a third processing run (run3) for example, a fifth signal lane pair (Pair$_{1,4}$) is established by connecting the receive path 105a of lane 1 (106a) is connected to transmit path 107d of the lane 4 (106d), and the transmit path 107a of lane 1 (106a) is connected to the receive path 105d of lane 4 (106d). Likewise, a sixth signal lane pair (Pair$_{2,3}$) is established by connecting the receive path 105b of lane 2 (106b) is connected to transmit path 107c of the lane 3 (106c), and the transmit path 107b of lane 2 (106b) is connected to the receive path 105c of lane 3 (106c). Accordingly, the receive signal paths 108a-108d and the transmit signal paths 110a-110d are configured to electrically conduct an electrical signal including, but not limited to, a digital signal and an RF signal, appearing on the DUT 104.

Each of the pulse sensors 112a-112d are coupled to the receive signal path and the transmit signal path of a respective signal lane 106a-106d, and each pulse sensor 112a-112d is configured to assign a first pulse timestamp to a first signal transmitted from the transmit signal path and received via the receive signal path, and to assign a second pulse timestamp to a second signal that is output to the transmit signal path following a predetermined time period after receiving the first signal and that is received via the receive signal path.

The processor 114 is in signal communication with the plurality of pulse sensors 112a-112d. The processor 114 is configured to receive the first pulse timestamps and the second pulse timestamps from each of the pulse sensors 112a-112d to determine an asymmetry in one or both of time or phase between one or more signal lane pairs included in the digital chip 102/digital logic circuitry.

The processor 114 determines at least one pair of signal lanes among the plurality of signal lanes 106a-106d. In at least one non-limiting embodiment, a pair of signal lanes is established by connecting the Rx signal path (e.g., 108a) of the first signal lane 106a to the Tx signal path (110b) of the second signal lane 106b and vice versa (Tx signal path 106a to Rx signal path 106b). Accordingly, the processor 114 determines a pair asymmetry that is indicative of a difference between the second timestamp corresponding to the second signal lane 106b and the first timestamp corresponding to the first signal lane 106a. In this manner, the first pulse timestamps and the second pulse timestamps from each of the pulse sensors 112a and 112b are determined by repeatedly generating the first pulse timestamps and the second pulse timestamps for signal lanes 106a and 106b included in the digital signal processing chip 102. In order to achieve a full round-robin measurement, the Tx and Rx paths of the first signal lane 106a are connected to the Rx and Tx paths of the third and fourth signal lanes 106c and 106d. This is repeated until all combinations of signal paths have been connected and measured using the prior prescribed method.

For every pair of signal lanes, the processor 114 can calculate a pair asymmetry for a given pair of signal lanes. The total propagation delay from a first lane 106a-106d (e.g., a primary lane, also referred to as "lane X") to a second lane 106a-106d (e.g., a secondary lane, also referred to as "lane Y") is defined as Delay$_{X,Y}$ in the following equation:

$$\text{Delay}_{X,Y} = RX\_\text{Time}_Y - TX\_\text{Time}_X; \quad \text{[Equation 1]}$$

where:
RX_Time$_Y$=Timestamp from the first lane (e.g., lane X) of when it transmitted the output signal;
TX_Time$_X$=Timestamp from the first lane (e.g., lane X) of when it received the repeated signal;

Similarly, the total propagation delay from the second lane (e.g., the secondary lane or "lane Y") to the first lane (e.g., the primary lane, or "lane X") is defined as Delay$_{X,Y}$ in the following equation:

$$\text{Delay}_{Y,X} = RX\_\text{Time}_X - TX\_\text{Time}_Y; \quad \text{[Equation 2]}$$

where:
RX_Time$_X$=Timestamp from the second lane (e.g., lane Y) of when it received the original signal; and
TX_Time$_Y$=Timestamp from the second lane (e.g., lane Y) of when it transmitted the repeated signal.

The asymmetry of the total propagation delay between the first signal lane (e.g., the primary lane or "lane X") to the second lane (e.g., the secondary lane or "lane Y") compared to the reverse (i.e. the second signal lane to the first signal lane) is defined as Pair_Asymm$_{X,Y}$, which can be expressed according to the following equation:

$$\text{Pair\_Asymm}_{X,Y} = \text{Delay}_{Y,X} - \text{Delay}_{X,Y} \quad \text{[Equation 3]}$$

Accordingly, substituting Equations 1 and 2 into Equation 3 allows for expressing the Pair_Asymm$_{X,Y}$ according to Equation 4 presented below:

$$\text{Pair\_Asymm}_{X,Y} = (RX\_\text{Time}_X - TX\_\text{Time}_Y) - (RX\_\text{Time}_Y - TX\_\text{Time}_X) \quad \text{[Equation 4]}$$

As expressed in Equation 4, the pair asymmetry for each pair of the signal lanes 106a-106d is determined based at least in part on a difference between: a difference of the timestamp associated with the receive path of a first signal lane (e.g., a primary signal lane or lane X) and the timestamp associated with the transmit path of a second signal lane (e.g., a secondary signal lane or lane Y); and a difference of the timestamp associated with the receive path of the second signal lane and the timestamp associated with the transmit path of the first signal lane. Accordingly, the pair asymmetry defined by Equation 4 above contains the total asymmetry of one pair of signal lanes. In other words, the pair asymmetry defined by Eq. 4 is indicative of the difference in delay when transmitting from the first lane (e.g., lane X) to the second lane (e.g., lane Y) compared to when transmitting from the second lane (e.g., lane Y) to the first lane (e.g., lane X).

As described herein, the RX signal paths 108a-108d define the full length of the RX delay inside the digital chip 102 or logic circuit, and TX signal paths 110a-110d define the full TX delay inside the digital chip 102 or logic circuit. As a result, the TX_DelayN can be defined as the total combined delay of the delay associated with a given TX signal path 110N and corresponding DUT TX path 107N, and the RX_DelayN as the total combined delay of a given RX signal path 108N and DUT RX path 105N. With this in mind, the asymmetry (Asymm$_N$) of a given lane 106N among the first signal lane and the second lane included in the Pair_AssymX,Y relationship is a difference between a total delay from a given TX signal path 110N to the connected DUT TX path 107N (TX_Delay$_N$) of the given signal lane 106N and a total delay from a given Rx signal path 108N to the connected DUT Rx path 105N (RX_Delay$_N$) of the given signal lane 106N. Accordingly, the lane asymmetry (Asymm$_N$) of an individual lane 106N can be defined as:

$$\text{Asymm}_N = \text{TX\_Delay}_N - \text{RX\_Delay}_N, \quad \text{[Equation 5]}$$

where "N" is a given signal lane 106N among the signal lanes 106a-106d included in the digital signal processing chip 102.

The Asymm$_N$ can be used to drive the pair asymmetries to zero to determine what portion of the total asymmetry of the delays between a first lane (e.g., lane X) and a second lane (e.g., lane Y) results from the first lane (e.g., lane X) and what portion results from the second lane (e.g., lane Y). Accordingly, the total asymmetry of one lane pair 106, 106b, 106c, 106d can be referred to as the "Pair_Error". That is, the difference in delay when transmitting from a first signal lane among all the lanes included in the digital chip 102/digital logic circuit compared to a second lane among all the lanes included in the digital chip 102/digital logic circuit.

As described herein, Asymm$_N$ is the TX/RX asymmetry of one lane (lane N) among the two lanes (e.g., Asymm$_N$=TX_Delay$_N$-RX_Delay$_N$). Therefore, a connection between a first lane and a second lane shown in FIG. 2, for example, can be expressed as:

$$\text{Pair\_Error}_{N,M} = \text{Asymm}_N - \text{Asymm}_M. \quad \text{[Equation 6]}$$

where "N" is a first lane among all the lanes 106a, 106b, 106c, 106d included in the DUT 104, and "M" is a second lane among all the lanes 106a, 106b, 106c, 106d included in the DUT 104.

Driving the pair asymmetries to zero allows for determining (e.g., solves or "converges") the asymmetry resulting from the pair of lanes N,M. In one or more non-limiting embodiments, a processor included in the electrical signal delay calibration system can utilize a non-linear solver such as NonLinearBlockGS or Newton, for example, can be utilized by the processor to converge (e.g., solve) the pair asymmetries to zero. Accordingly, the asymmetry resulting from the pair of lanes N,M can be expressed as:

$$\text{Pair\_Error}_{N,M} - \text{Asymm}_N + \text{Asymm}_M = 0 \quad \text{[Equation 7]}$$

Applying Equation 7 to all the lanes included in the DUT 104 can generate an optimization algorithm that determines the asymmetry of all the lanes so that they can be identified and removed (e.g., removed mathematically). In this manner, the total error of the DUT 104 (e.g., a signal delay in each of the signal lanes based on each of the lane asymmetries) can be minimized.

Referring to the example shown in FIG. 2, the asymmetry (Assym$_N$) for each signal lane 1 to 4 (106a-106d) can be identified by solving the optimization algorithm expressed in Equation 8 below.

$$\begin{aligned}\text{TotalError} = &\text{Pair\_Error}_{1\_2} - (\text{Asymm}_1 - \text{Asymm}_2) + \text{Pair\_Error}_{3\_4} - (\text{Asymm}_3 - \text{Asymm}_4) + \text{Pair\_Error}_{1\_3} - \\&(\text{Asymm}_1 - \text{Asymm}_3) + \text{Pair\_Error}_{2\_4} - (\text{Asymm}_2 - \\&\text{Asymm}_4) + \text{Pair\_Error}_{1\_4} - (\text{Asymm}_1 - \text{Asymm}_4) + \\&\text{Pair\_Error}_{2\_3} - (\text{Asymm}_2 - \text{Asymm}_3)\end{aligned} \quad \text{[Equation 8]:}$$

As described herein, a processor included in the electrical signal delay calibration system can utilize a non-linear solver such as NonLinearBlockGS or Newton, for example, to converge (e.g., solve) each of the pair asymmetries (e.g., Asymm$_M$-Asymm$_N$) to zero to identify each of the lane asymmetries contributing to the total pair asymmetry in each of the signal lanes. In turn, removing (e.g., using the processor) the identified lane asymmetries (Assym$_N$) (e.g., mathematically) the total error (Total$_{Error}$) of the DUT 104 (e.g., the digital logic chip 102 or the digital logic circuitry) can be minimized.

Figure 3:
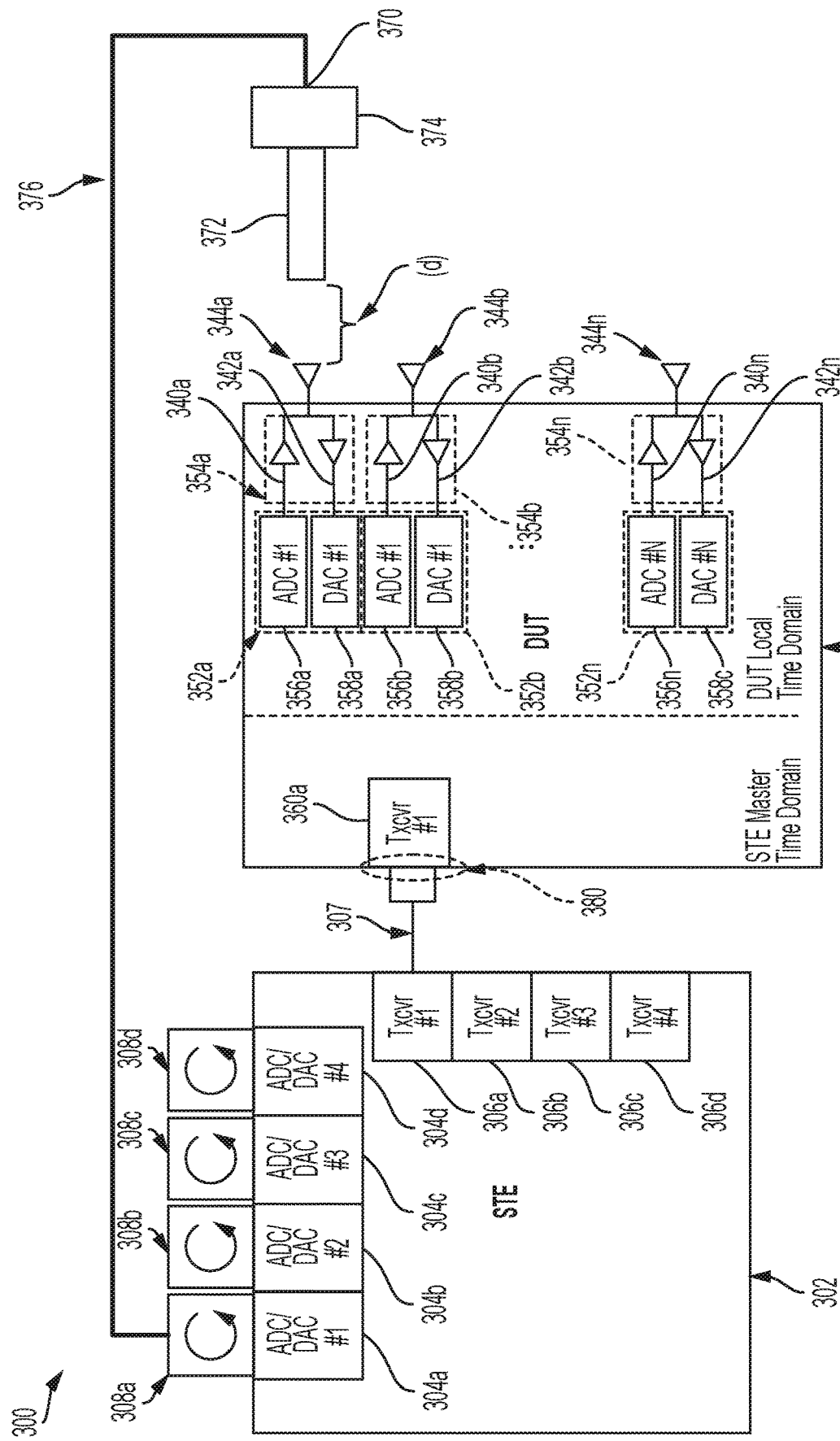
FIG. 3 is a block diagram illustrating a digital phased array calibration system according to a non-limiting embodiment.

Turning now to FIG. 3, a digital phased array calibration system 300 is illustrated according to a non-limiting embodiment of the present disclosure. The digital phased array calibration system 300 can time link together special test equipment (STE) (e.g., an FPGA) and a DUT (e.g., a digital phased array) using a data link, and utilize the STE as a primary source of time while utilizing the both the STE and DUT to perform array probing and RF measurement. The signals transmitted from the STE (e.g., DACs) to the DUT (e.g., ADCs) can be timestamped upon transmit from the DAC and upon receipt at the ADC. The timestamps can then be recorded and the phase analyzed at receipt of the ADC. The same measurement can be performed in reverse, with the DUT transmitting through DACs and the STE receiving on ADCs. The probing can include, for example, near-field probing, compact range probing and/or far-field probing) one channel at a time. Accordingly, all channel path variations from inside the STE, include the transceivers 306a-306d, ADCs/DACs 304a-304d, and cable 307a, and extending to elements can be captured using the prior described round robin measurement process and calibrated out (i.e., removed). In this manner, the digital phased array calibration system 300 allows numerous subarrays to be calibrated to the same insertion phase without a golden standard such that calibration and synchronization of a digital phased array can be greatly simplified. In addition, replacing the digital phased array with another STE server effectively creates a remote network analyzer where the ports could be physically separated from each other. In this manner, the digital phased array calibration system 300 can provide remote network analyzation capabilities.

With continued reference to FIG. 3, the digital phased array calibration system 300 includes a digital signal processing chip 302, a device under test 350, and a signal probe assembly 370. The digital signal processing chip 302 includes a plurality of chip analog-to-digital and digital-to-analog (ADC/DAC) units 304a, 304b, 304c and 304d and a plurality of high-speed serial transceiver signal lanes 306a, 306b, 306c and 306d. Each of the ADC/DAC units 304a, 304b, 304c and 304d is in signal communication with a respective circulator 308a, 308b, 308c and 308d. The circulators 308a, 308b, 308c and 308d are configured to establish a bidirectional data exchange for data transmission (Tx) and data reception (Rx). A transceiver signal lane (e.g., signal lane 306a) 306a-306d is in signal communication with a chip signal path 307 (e.g., chip signal path 307a). The chip signal path 307 can be established using, for example, a fiber cable. While FIG. 3 illustrates an instantiation with four ADCs, four DACs, and four transceiver lanes, the present disclosure can be extended to any arbitrary number of ADC/DAC pairs, and any arbitrary number of transceiver lanes.

The device under test 350 is in signal communication with the digital signal processing chip 302. According to one or more non-limiting embodiments, the device under test 350 includes a digital phased array 350. The digital phased array 350 includes a plurality of DUT ADC/DAC units 352a, 352b, 352n, a plurality of radiators (e.g., antennas) 344a, 344b, 344n, and a plurality of DUT transceivers 360a and 360b.

The DUT ADC/DAC units 352a, 352b, 352n are configured to operate according to a first time domain (e.g., local time domain) set by the DUT 350. According to a non-limiting embodiment, the first time domain is set by a recovered clock from a time input to the DUT 350 in a deterministic fashion. The DUT ADC/DAC units 352a, 352b, 352n are in signal communication with a respective DUT signal lane 354a, 354b, 354n. The DUT signal lanes each include a DUT transmit (Tx) path 340a, 340b, 340n and a DUT receive (Rx) path 342a, 342b, 342n.

Each of the DUT ADC/DAC units 352a, 352b, 352n includes an ADC 356a, 356b, 356n and a DAC 358a, 358b, 358n. The DUT transmit (Tx) paths 340a, 340b, 340n are in signal communication with a respective ADC 356a, 356b, 356n. Likewise, the DUT receive (Rx) paths 342a, 342b, 342n are in signal communication with the DAC 358a, 358b, 358n with a respective DAC 358a, 358b, 358n.

The radiators 344a, 344b, 344n can be implemented as antennas, for example, and configured to wirelessly transmit and/or receive an electrical signal including, but not limited to, an RF signal. Each radiator 344a, 344b, 344n is in signal communication with a respective DUT signal lane 354a, 354b, 354n. According to a non-limiting embodiment, the DUT Tx path and the DUT Rx path of a given DUT signal lane 354a, 354b, 354n share a respective radiator 344a, 344b, 344n.

The DUT transceiver 360a is configured to operate according to a second time domain (e.g. a STE time domain) set by the digital signal processing chip 302. The DUT transceiver 360a is configured to exchange data with a transceiver signal lane 306a, 306b, 306c, or 306d included with the digital signal chip 302. According to a non-limiting embodiment, the second time domain is set by a recovered clock from a time input to the digital signal processing chip 302, and there is an unknown delay and Tx/Rx skew existing from the STE primary time domain to the DUT local time domain. The unknown delay and Tx/Rx skew can be caused by routing delays and/or first-in-first-out (FIFO) data flow delays (e.g., FIFO per-queue delays). In some instances, the skews from the second time domain (i.e., STE time domain) to the first time domain (i.e., the DUT local time domain) is consistent across power-ups, but different for each DUT due to process tolerances.

The signal probe assembly 370 includes a probe sensor 372, a calibration switch 374, and a signal wire 376. The probe sensor 372 is configured for arrangement a distance (d) away from a target radiator 344a, 344b, 344c for near-field probe RF measurement of the target radiator 344a, 344b, 344c. The signal wire 376 includes a first end in signal communication with the calibration switch 374 and an opposing second end in signal communication with one of the circulators 308a, 308b, 308c, or 308d. The probe sensor 372 is in signal communication with the calibration switch 374, which can select between an open path, a close/short path, and a through-pass path to perform calibration of the phase, time delay, and/or loss of the signal wire 376.

According to a non-limiting embodiment, a precision time of the signal probe assembly 370 is established at a time reference plane 380 established by the connection between the chip signal path 307a and the DUT transceivers 360a.

Figure 4:
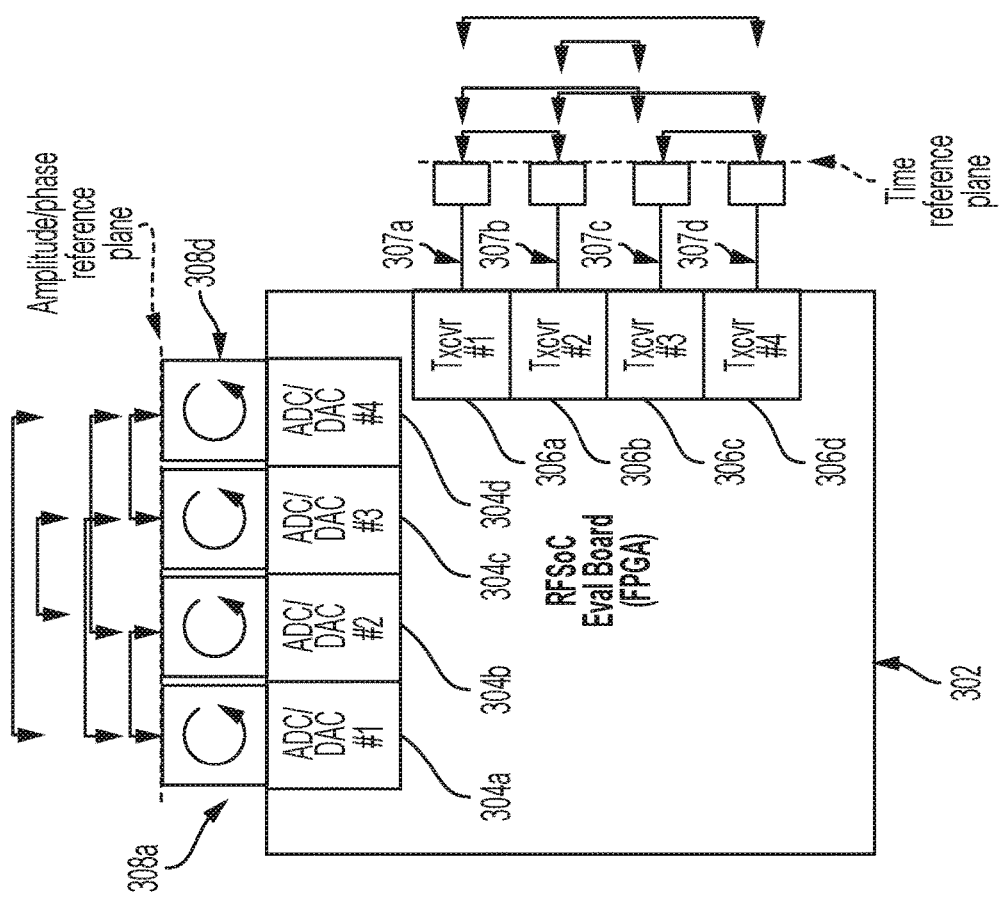
FIG. 4 is a block diagram illustrating a test equipment calibration operation for calibrating test equipment implemented with the digital phased array calibration system of FIG. 3 according to a non-limiting embodiment.

Turning to FIG. 4, a local calibration operation for calibrating the digital signal processing chip 302 is illustrated according to a non-limiting embodiment. The round-robin timestamp measuring scheme described according to non-limiting embodiments of the disclosure can be utilized to calibrate out Tx and/or Rx skews appearing in the transceiver signal lanes 306a, 306b, 306c and 306d. According to one or more non-limiting embodiments, a common cable 307a or other type of electrical connection can be used to connect each of the transceiver signal lanes 306a, 306b, 306c and 306d, for the round robin measurement.

The round-robin timestamp measuring scheme can be applied to the ADC/DAC units 304a, 304b, 304c and 304d to calibrate out the Ts/Rx lane skew caused by time delays. For example, a common cable 376 or other type of electrical connection can be used to connect each ADC/DAC unit 304a, 304b, 304c and 304d, and the round robin measurement can be applied to calibrate and synchronize the time delay variations between the ADC/DAC units 304a, 304b, 304c and 304d.

According to a non-limiting embodiment, the same calibration can be performed across the ADC/DAC units 304a, 304b, 304c and 304d, but in amplitude and phase instead of in the time domain. For example, a common cable 376 or other type of electrical connection having a characterized or known amplitude can be used, and the round robin measurement can then be performed to calibrate phase variations between the ADC/DAC units 304a, 304b, 304c and 304d that are not time related or independent of the time domain. After calibration, the ADC/DAC units will all have the same amplitude and phase at the output of the circulators 308a-308d. This serves as the amplitude and phase reference plane such that there are not STE delay/skew effects remaining when measuring the DUT.

Referring back to FIG. 3, after locally calibrating the STE 302 (e.g., the FPGA), the transceivers 306a-306d will have a fully characterized time delay. Therefore, at the time reference plane 380, the time delay is characterized and can be utilized to perform the digital phased array calibration and synchronization operation. According to one or more non-limiting embodiments, signal pulses are output from the STE 302 and are received at the DUT 350 where they are timestamped. The time delays are then subtracted from the asymmetries associated with the RF probe assembly 370 and the STE 302 that were characterized during the previous stages (e.g., during the local STE calibration and the phase assembly calibration). In addition, the propagation phase and free space path delays through the probe and air are subtracted based on known free space propagation formulas. The remaining difference ($\Delta TS$) between timestamps assigned to signals output from the STE 302 and timestamps input at the DUT 350 defines the delays inside the DUT 350, which are caused by the asymmetry appearing between the time reference plane 380 to the target radiator 344a, 344b, 344n being probed/measured by the probing assembly 370. Accordingly, the timestamps can be adjusted so that $\Delta TS$ is zero. The aforementioned process can be repeated for each radiator 344a, 344b, 344n targeted by the probe assembly until the DUT 350 (e.g., the digital phased array) is completely calibrated and synchronized, i.e., all the asymmetries are fully minimized or even completely removed.

Figure 5:
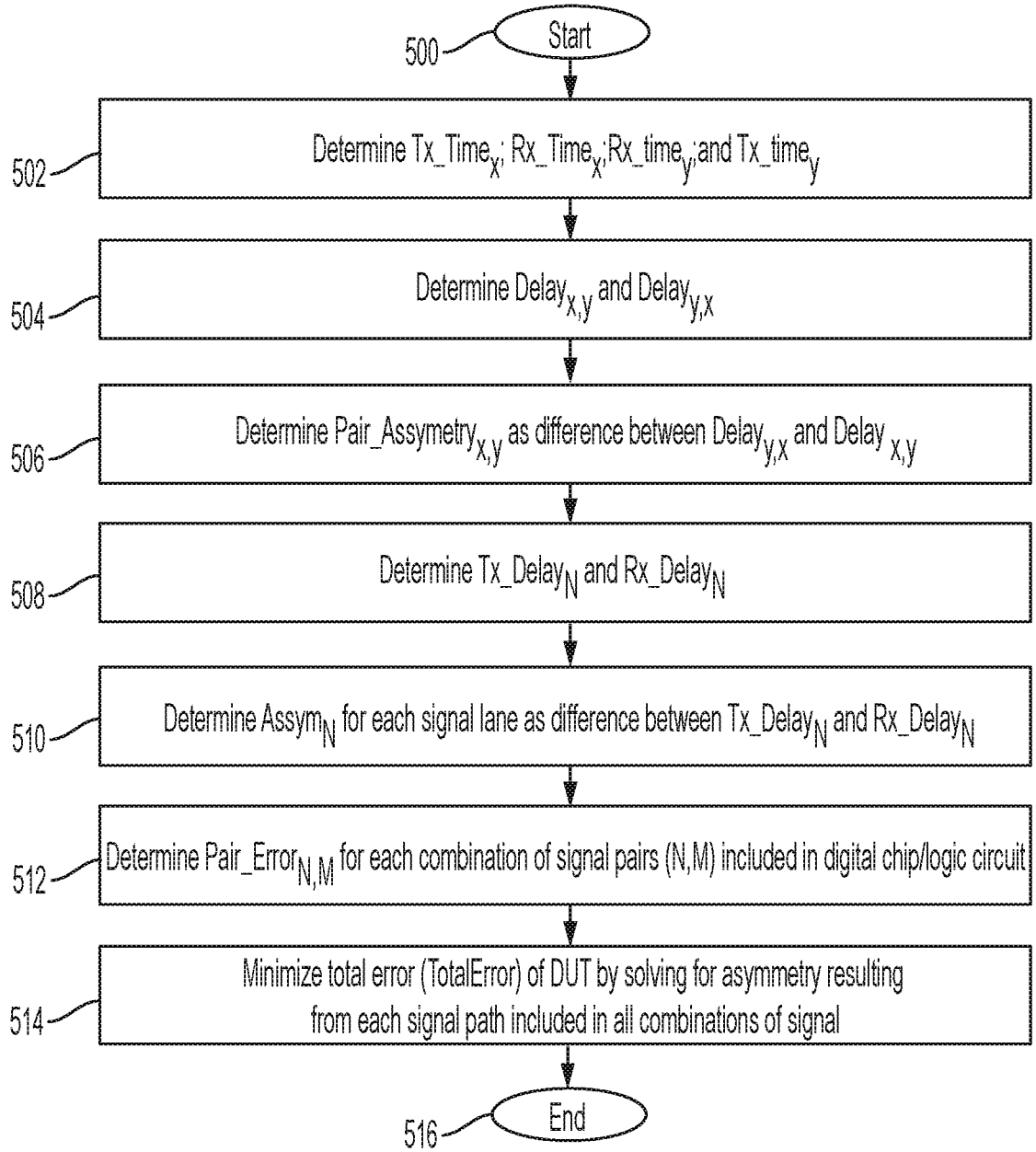
FIG. 5 is a flow diagram illustrating a method of performing timing, amplitude and phase calibration in a multi-node digital signal processing chip according to a non-limiting embodiment.

Referring now to FIG. 5, a flow diagram illustrates a method for calibrating digital logic circuitry is illustrated according to a non-limiting embodiment. Accordingly, a method can be provided to perform timing, amplitude and phase calibration in a multi-node digital signal processing chip according to a non-limiting embodiment.

The method illustrated in FIG. 5 begins at operation 500 and at operation 502 Tx_TimeX, Rx_TimeX, Rx_TimeY, and Tx_TimeY are determined. At operation 504, DelayX, Y and Delay Y,X are determined, and the Pair_AssymetryX,Y is determined as difference between DelayY, X and DelayX, Y at operation 506. At operation 508, Tx_Delay$_N$ and Rx_Delay$_N$ are determined, and the Assym$_N$ for each signal lane is determined as the difference between Tx_Delay$_N$ and Rx_Delay$_N$ at operation 510. At operation 512, the Pair_ErrorN,M for each combination of signal pairs (N,M) included in DUT is determined. At operation 514, the total error (Total$_{Error}$) of DUT is minimized by solving for asymmetry resulting from each signal path included in all combinations of signal, and the method ends at operation 516.

Figure 6:
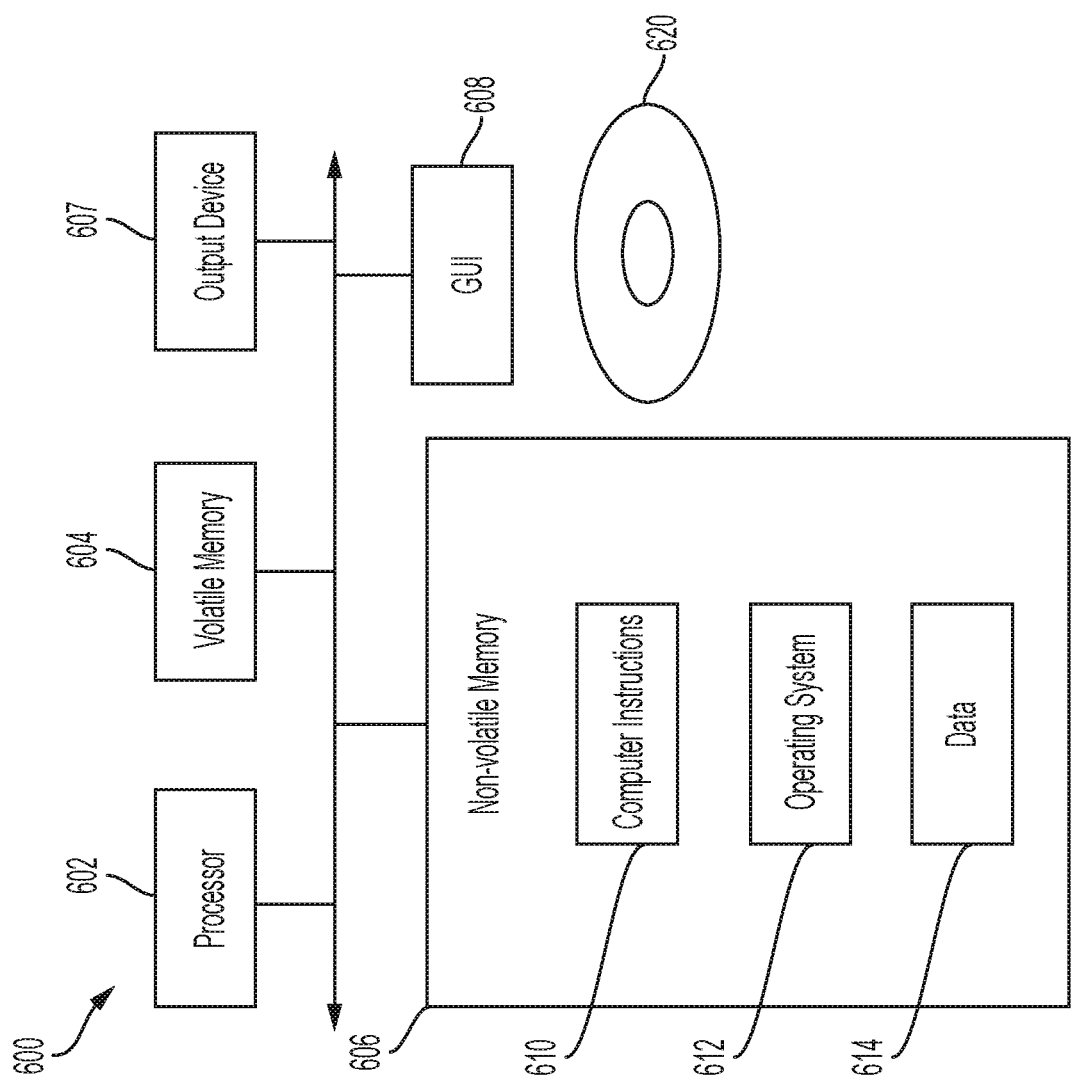
FIG. 6 depicts a computer system capable of performing at least a portion of the processing operations performed by an electric signal delay calibration system 100 according to a non-limiting embodiment.

With reference to FIG. 6, an example computer 600 that can perform at least a portion of the processing described herein is illustrated according to a non-limiting embodiment. The computer 600 can perform processing to perform the operations illustrated in FIGS. 1-5. The computer 600 includes a processor 602, a volatile memory 604, a non-volatile memory 606 (e.g., hard disk), an output device 607 and a graphical user interface (GUI) 608 (e.g., a mouse, a keyboard, a display, for example). The non-volatile memory 606 stores computer instructions 610, an operating system 612 and data 614. In one example, the computer instructions 610 are executed by the processor 602, out of volatile memory 604. In a non-limiting embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., RAM/ROM, CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array), a general purpose graphical processing units (GPGPU), and/or an ASIC (application-specific integrated circuit)).

The corresponding structures, materials, acts, and equivalents of all means plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form detailed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the various embodiments with various modifications as are suited to the particular use contemplated.

While the preferred embodiments have been described, it will be understood that those skilled in the art, both now and in the future, may make various improvements and enhancements which fall within the scope of the claims which follow. These claims should be construed to maintain the proper protection for the disclosure as first described.

What is claimed is:

1. An electrical signal delay calibration system comprising:
   a device under test (DUT) including a plurality of DUT receive paths and a plurality of DUT transmit signal paths;
   a digital signal processing chip including a plurality of signal lanes, each signal lane including a receive signal path in signal communication with a respective DUT receive path and a transmit signal path in signal communication with a respective DUT transmit path; and
   a processor configured to determine a plurality of transmit pulse timestamps assigned to transmit signals transmitted on the transmit signal paths and to determine a plurality of receive pulse timestamps assigned to receive signals received from the receive signal paths,
   wherein the processor determines a lane asymmetry associated with each signal lane among the plurality of signal lanes based on at least one of the transmit pulse timestamps and at least one of the receive pulse timestamps, and removes each of the lane asymmetries to minimize a signal delay in each signal lane among the plurality of signal lanes.

2. The electrical signal delay calibration system of claim 1, wherein the processor determines one or more combinations of signal lane pairs among the plurality of signal lanes, and determines the lane asymmetries based on a pair asymmetry of each of the signal lane pairs.

3. The electrical signal delay calibration system of claim 2, wherein each of the signal lane pairs is established by connecting the DUT receive path that is in signal communication with a first signal lane among the plurality of signal lanes with the DUT transmit path that is in signal communication with a second signal lane among the plurality of signal lanes, and connecting the DUT transmit path that is in signal communication with the first signal lane among the plurality of signal lanes with the DUT receive path that is in signal communication with the second signal lane among the plurality of signal lanes.

4. The electrical signal delay calibration system of claim 3 further comprising a plurality of pulse sensors in signal communication with the processor, each of the pulse sensors coupled to the receive signal path and the transmit signal path of a respective signal lane, wherein each of the pulse sensors assigns the transmit pulse timestamp to the transmit signal transmitted from the transmit signal path and received via the receive signal path, and assigns the receive pulse timestamp to the receive signal that is output to the transmit signal path following a predetermined time period after receiving the transmit signal and that is received via the receive signal.

5. The electrical signal delay calibration system of claim 4, wherein the processor determines the pair asymmetry for each of the signal lane pairs based on a difference between a first delay when transmitting the transmit signal from the first signal lane included in the signal lane pair to the second signal lane include in the signal lane pair and a second delay when transmitting from the second signal from the second signal lane included in the signal lane pair to the first signal lane included in the signal lane pair.

6. The electrical signal delay calibration system of claim 5, wherein:
the first delay is a difference between a first transmit timestamp assigned to a first transmit signal from the first lane and a first receive timestamp assigned to a first receive signal on the second lane; and
the second delay is a difference between a second transmit timestamp assigned to a second transmit signal from the second lane and a second receive timestamp assigned to a second receive signal on the first lane.

7. The electrical signal delay calibration system of claim 6, wherein the processor determines the lane asymmetry for each of the signal lanes based on a difference between the first delay and the second delay.

8. The electrical signal delay calibration system of claim 7, wherein the processor generates an optimization algorithm indicative of a signal delay in each of the signal lanes based on each of the lane asymmetries, and converges the optimization algorithm to identify each of the lane asymmetries causing the signal delay in each of the signal lanes.

9. The electrical signal delay calibration system of claim 8, wherein the processor removes each of the lane asymmetries identified by the optimization algorithm thereby minimizing the signal delay in each of the signal lanes.

10. The electrical signal delay calibration system of claim 9, wherein the processor utilizes a non-linear programming solver to converge the optimization algorithm.

11. A method for calibrating digital logic circuitry, the method comprising:
connecting a device under test (DUT) receive path to a receive signal path included in a signal lane among a plurality of signal lanes included in the digital logic circuitry, and connecting a DUT transmit path to a transmit signal path included in the signal lane;
delivering one or more transmit signals on one or more of the transmit signal lines and receiving one or more receive signals on one or more of the receive signal lines;
determining, by a processor, a plurality of transmit pulse timestamps assigned to the transmit signals and determining a plurality of receive pulse timestamps assigned to the receive signals;
determining, by the processor, a lane asymmetry associated with each signal lane among the plurality of signal lanes based on at least one of the transmit pulse timestamps and at least one of the receive pulse timestamps; and
removing, by the processor, each of the lane asymmetries to minimize a signal delay in each signal lane among the plurality of signal lanes.

12. The method of claim 11, further comprising:
determining, by the processor, one or more combinations of signal lane pairs among the plurality of signal lanes; and
determining, by the processor, the lane asymmetries based on a pair asymmetry of each of the signal lane pairs.

13. The method of claim 12, wherein each of the signal lane pairs is established by:
connecting the DUT receive path that is in signal communication with a first signal lane among the plurality of signal lanes with the DUT transmit path that is in signal communication with a second signal lane among the plurality of signal lanes; and
connecting the DUT transmit path that is in signal communication with the first signal lane among the plurality of signal lanes with the DUT receive path that is in signal communication with the second signal lane among the plurality of signal lanes.

14. The method of claim 13, wherein determining the plurality of transmit pulse timestamps and the plurality of receive timestamps comprises:
connecting a pulse sensor to the receive signal path and the transmit signal path of each of the signal lanes;
assigning, by the pulse sensor, the transmit pulse timestamp to the transmit signal transmitted from the transmit signal path and received via the receive signal path; and
assigning, by the pulse sensor, the receive pulse timestamp to the receive signal that is output to the transmit signal path following a predetermined time period after receiving the transmit signal and that is received via the receive signal; and
delivering the transmit pulse timestamps and the receive pulse timestamps from each of the pulse sensors to the processor.

15. The method of claim 14, determining, by the processor, the pair asymmetry for each of the signal lane pairs based on a difference between a first delay when transmitting the transmit signal from the first signal lane included in the signal lane pair to the second signal lane include in the signal lane pair and a second delay when transmitting from the second signal from the second signal lane included in the signal lane pair to the first signal lane included in the signal lane pair.

16. The method of claim 15, further comprising:
calculating, by the processor, the first delay as a difference between a first transmit timestamp assigned to a first transmit signal from the first lane and a first receive timestamp assigned to a first receive signal on the second lane; and
calculating, by the processor, the second delay as a difference between a second transmit timestamp assigned to a second transmit signal from the second lane and a second receive timestamp assigned to a second receive signal on the first lane.

17. The method of claim 16, further comprising determining, by the processor, the lane asymmetry for each of the signal lanes based on a difference between the first delay and the second delay.

18. The method of claim 17, further comprising generating, by the processor, an optimization algorithm indicative of a signal delay in each of the signal lanes based on each of the lane asymmetries; and converging, by the processor, the optimization algorithm so as to identify each of the lane asymmetries causing the signal delay in each of the signal lanes.

19. The method of claim 18, further comprising minimizing the signal delay in each of the signal lanes in response to removing, by the processor, each of the lane asymmetries identified by the optimization algorithm.

20. The method of claim 19, wherein identifying each of the lane asymmetries includes utilizing, by the processor, a nonlinear programming solver to converge the optimization algorithm.

* * * * *